United States Patent Office 3,169,648
Patented Feb. 16, 1965

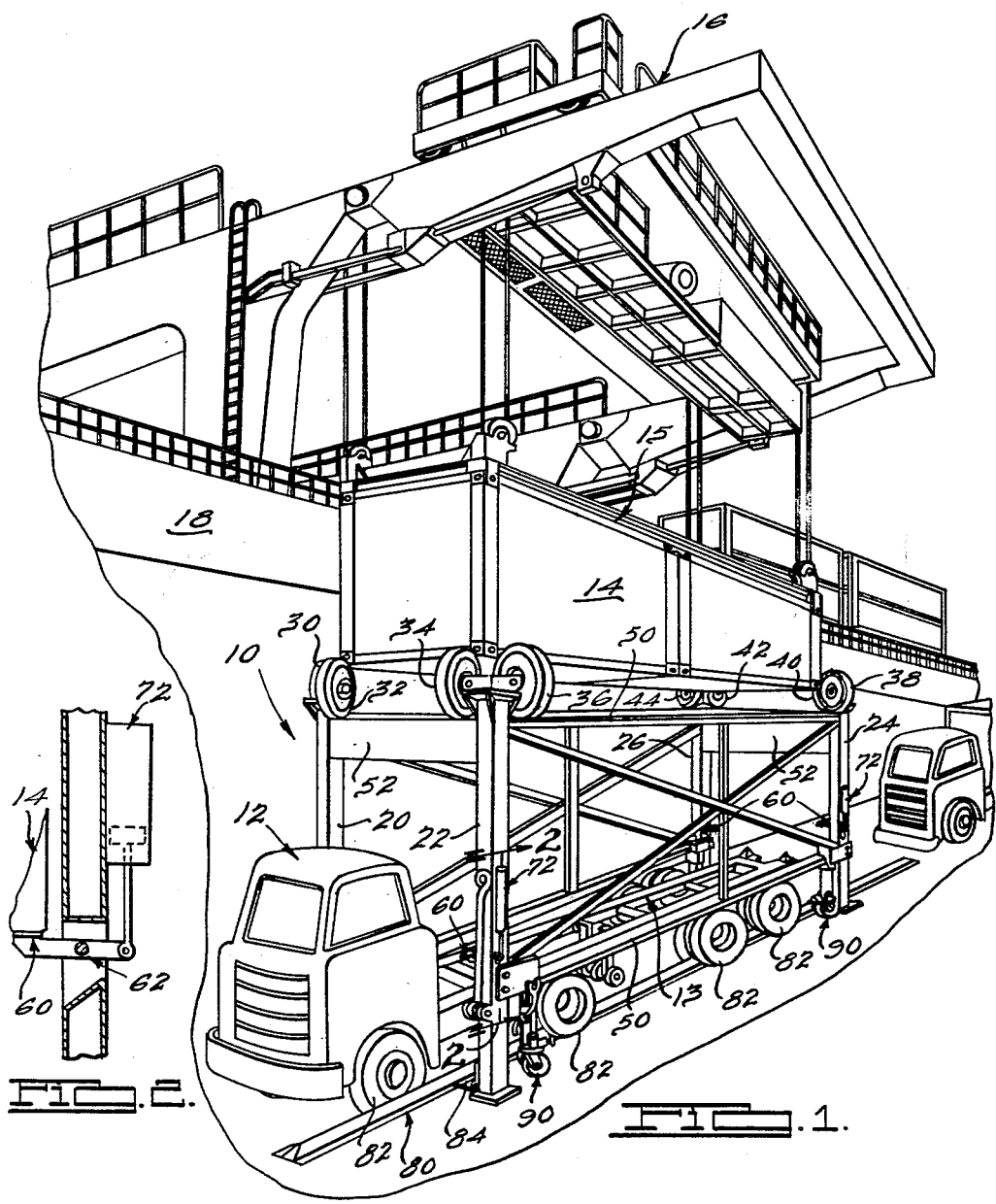

3,169,648
CONTAINER ALIGNMENT CHUTE
Keith W. Tantlinger, Grosse Pointe Shores, Mich., assignor to Fruehauf Corporation, Detroit, Mich., a corporation of Michigan
Filed July 5, 1962, Ser. No. 207,495
2 Claims. (Cl. 214—41)

This invention relates generally to freight handling apparatus and more particularly to a novel container alignment chute for guiding shipping containers into a predetermined position relative to a vehicle to facilitate coupling therebetween.

The transfer of shipping containers between, for example, a ship and a dock facility, is generally accomplished by coupling a spreader bar of an overhead crane to the shipping container and lowering the shipping container to the dock. However, positioning of the shipping container relative to a vehicle, for example, a truck, having a frame complementary to the shipping container, is often difficult due to the inherent pendulous movement of the suspended relatively heavy container complicated by wind conditions, rolling of the ship at dockside, etc.

This problem is solved, in accordance with the instant invention, by a novel portable alignment chute that is superimposed above the frame of a wheeled vehicle so as to guide the shipping container into position relative to the vehicle to facilitate coupling therebetween. The alignment chute is also provided with a means for guiding the vehicle into predetermined position relative to the chute itself. In addition, means is provided to support a shipping container at an initial position within the alignment chute so as to free the overhead crane for return to, for example, the hold of a ship to pick up the next shipping container.

Accordingly, one object of the instant invention is an improved alignment chute for shipping containers.

Another object is an alignment chute having means to guide a shipping container into predetermined position relative to the alignment chute to facilitate coupling to a wheeled vehicle.

Another object is an alignment chute having means to guide a vehicle into predetermined position relative to the chute.

Another object is an alignment chute having means to support a shipping container in a pre-coupling position, thereby to free the spreader bar.

Other objects and advantages of the instant invention will be apparent in the following description, claims and drawings wherein:

FIGURE 1 is a fragmentary perspective view of an alignment chute in accordance with the instant invention shown in operative association with a wheeled vehicle and a shipboard-mounted overhead crane; and FIG. 2 is a cross-sectional view taken substantially along the line 2—2 of FIGURE 1.

An alignment chute 10, in accordance with an exemplary constructed embodiment of the instant invention, is shown in operative association with a wheeled vehicle 12 which has a container-accepting chassis 13. A shipping container 14 is secured to a spreader bar 15, which is suspended from an overhead crane 16. The crane 16 is mounted aboard, for example, a ship 18. It is to be understood that the vehicle 12, container 14, crane 16 and ship 18 are conventional in construction, the alignment chute 10 being compatible therewith and with virtually all known transportation facilities and apparatus for the handling of containers.

In accordance with one feature of the instant invention, the alignment chute 10 comprises a plurality of vertically extending corner members 20, 22, 24 and 26 having normally orientated pairs of relatively large wheels 30–32, 34–36, 38–40 and 42–44 at the upper ends thereof, respectively, that operate to rollably gather the shipping container 14 as it moves downwardly toward the vehicle 12.

The corner members 20, 22, 24 and 26, in combination with a plurality of horizontal longitudinally extending frame members 50 and horizontal lateral frame members 52, define a generally rectangular enclosure that is open at the top for the acceptance of the container 14 as it moves downwardly toward the vehicle 12.

In accordance with another feature of the instant invention, the alignment chute 10 is provided with a plurality of container support pads 60, respectively, that are pivotally supported as by pins 62 on the corner members 20, 22, 24 and 26. The support pads initially support the container 14 at a point above the container-accepting chassis 13 of the vehicle 12. The pads 60 are controlled by a plurality of hydraulic actuators 72 that are concomitantly operable to effect lowering of the container 14 onto the chassis 13 of the vehicle 12 at such time as the vehicle 12 is properly positioned within the chute 10.

In accordance with yet another feature of the instant invention, the alignment chute 10 is provided with a foldable guideway 80 that functions to guide the tires 82 of the vehicle 12 as the vehicle 12 moves into the chute 10. In the exemplary embodiment illustrated, the guideway 80 is pivotally secured to the corner members 22 and 24 as by hinges 84 (one of which is shown).

The chute 10 is provided with a plurality of wheels 90 which, upon lowering into engagement with the ground, condition the alignment chute 10 for movement about a dock facility.

It is to be understood that the specific constructions of the improved container alignment chute herein disclosed and described are presented for the purpose of explanation and illustration and are not intended to indicate limits of the invention, the scope of which is defined by the following claims.

What is claimed is:

1. In combination with an over-the-road wheeled vehicle and a container handling crane, an alignment chute for positioning a generally rectangular shipping container with respect to the vehicle while pendently suspended from the crane to facilitate coupling therebetween, said alignment chute comprising a plurality of spaced vertically extending side members arranged in a generally rectangular array having means at the tops thereof, respectively, for gathering the shipping container horizontally of said alignment chute upon movement of the container downwardly toward the vehicle, said alignment chute having a horizontally extending top opening for the acceptance of the shipping container and a vertically extending side opening for the acceptance of the vehicle, means in vertically spaced relationship to the top opening in said chute for aligning the vehicle with the top opening upon movement of the vehicle through the vertically extending side opening therein, and means for supporting the container at an initial position in spaced relationship above the vehicle, said supporting means being lowerable to effect lowering of the container into a coupling position at such times as a vehicle is properly positioned in said chute.

2. An alignment chute for positioning a generally rectangular shipping container over the chassis of a wheeled vehicle to facilitate coupling therebetween, said alignment chute comprising a plurality of vertically extending members arranged in a generally rectangular array having
- pairs of normally orientated wheels, respectively, at the top thereof for gathering the shipping container horizontally of said alignment chute upon movement of the container downwardly toward the vehicle, said alignment chute having
  - a horizontally extending top opening for the acceptance of the shipping container and
  - a verticaly extending side opening for the acceptance of the vehicle,
- an elongated foldable guide for engaging the wheels of the vehicle so as to align the vehicle with the top opening in said chute upon movement of the vehicle through the vertically extending side opening therein, and
- a plurality of elevatable pads for supporting the container at an initial position in spaced relationship above the chassis of the vehicle, said pads including
  - a plurality of hydraulic actuators operable to effect lowering of the container into a coupling position at such times as the vehicle is properly positioned in said chute.

References Cited in the file of this patent

UNITED STATES PATENTS

| | | |
|---|---|---|
| 755,087 | Ward | Mar. 22, 1904 |
| 784,465 | Anderson | Mar. 7, 1905 |
| 1,980,850 | Clark | Nov. 13, 1934 |
| 3,034,659 | Willison et al. | May 15, 1962 |